United States Patent
Park et al.

(10) Patent No.: US 9,944,218 B1
(45) Date of Patent: Apr. 17, 2018

(54) CURRENT CONTROL APPARATUS AND VEHICLE HAVING THE SAME

(71) Applicants: Hyundai Motor Company, Seoul (KR); Kia Motor Corporation, Seoul (KR)

(72) Inventors: ChoongSeob Park, Gyeonggi-do (KR); TaeSun Roh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/710,628

(22) Filed: Sep. 20, 2017

(30) Foreign Application Priority Data

Mar. 21, 2017 (KR) .................. 10-2017-0035035

(51) Int. Cl.
  *B60Q 1/00* (2006.01)
(52) U.S. Cl.
  CPC .................. *B60Q 1/0088* (2013.01)
(58) Field of Classification Search
  CPC ............ H05B 33/0815; H05B 33/0842; H05B 33/0845; H05B 37/02; H05B 41/2828; H05B 41/3927; H02M 3/156; Y02B 20/347; Y02B 20/186; F21V 23/003; B60C 1/2607; B60C 1/0088
  See application file for complete search history.

(56) References Cited

U.S. PATENT DOCUMENTS

| | | | |
|---|---|---|---|
| 6,586,890 B2* | 7/2003 | Min .................. | B60Q 1/2607 315/224 |
| 7,466,566 B2* | 12/2008 | Fukumoto ........... | H02M 7/4807 363/132 |
| 8,258,763 B2 | 9/2012 | Nakamura et al. | |
| 8,773,031 B2* | 7/2014 | Sadwick ............ | H05B 33/0887 315/224 |
| 8,972,032 B2* | 3/2015 | Hao ....................... | H02N 2/142 700/13 |
| 2005/0017760 A1 | 1/2005 | Grasso et al. | |
| 2008/0136264 A1 | 6/2008 | Yoshida et al. | |
| 2014/0239851 A1 | 8/2014 | Aoki et al. | |
| 2015/0158414 A1 | 6/2015 | Ohta | |

FOREIGN PATENT DOCUMENTS

| | | |
|---|---|---|
| JP | 2008-275524 A | 11/2008 |
| JP | 2009-261213 A | 11/2009 |
| KR | 10-1253035 B1 | 4/2013 |

\* cited by examiner

*Primary Examiner* — Haissa Philogene
(74) *Attorney, Agent, or Firm* — Mintz Levin Cohn Ferris Glovsky and Popeo, P.C.; Peter F. Corless

(57) ABSTRACT

A current control apparatus for controlling current of a lamp in a vehicle includes: a plurality of output pins to output currents of different values; an output signal feedback part connected to each of the plurality of output pins, and to generate one of a plurality of output feedback signals; a reference signal generation part to generate one of a plurality of reference signals; a signal selection part configured to select one of the plurality of output feedback signals, and to select one of the plurality of reference signals; a comparator to compare the received output feedback signal to the received reference signal, and to output a signal difference between the receive output feedback signal and the received reference signal; and a constant current driver configured to constantly adjust a current output through one of the plurality of output pins based on the signal difference.

18 Claims, 15 Drawing Sheets

CURRENT CONTROL APPARATUS AND VEHICLE HAVING THE SAME

CROSS-REFERENCE TO RELATED APPLICATION

This application claims under 35 U.S.C. § 119(a) the benefit of Korean Patent Application No. 10-2017-0035035, filed on Mar. 21, 2017 in the Korean Intellectual Property Office, the entire contents of which are incorporated by reference herein.

BACKGROUND

1. Technical Field

The present disclosure relates to a current control apparatus for controlling a current of a lamp, and a vehicle having the same.

2. Description of the Related Art

A vehicle typically includes a light unit to enable a driver to easily see information of surroundings while keeping his/her eyes forward, and to perform a function of signaling or communicating with other vehicles and pedestrians, as well as a lighting function.

The light unit includes a plurality of lamps. The plurality of lamps includes an illuminating lamp to illuminate a long distance, a short distance, and the rear direction; a signal lamp to inform a brake, a turning direction, and an emergency situation; and a display lamp to display the width of the vehicle, the height of the body, license plate lighting, and parking.

The vehicle includes a cluster to output information of the vehicle and information related to driving (a tachometer, a speedometer, a coolant temperature sensor, a fuel gauge, etc.).

The cluster includes a brake warning lamp, a seat belt warning lamp, an anti-lock brake system (ABS) warning lamp, a traction control system (TCS) warning lamp, and other lamps configured to indicate operation states and warning states of systems attached within the vehicle.

The center fascia includes a plurality of buttons for operating a variety of devices, e.g., an audio, an air conditioner and an emergency lamp. The plurality of buttons provided in the center fascia includes a plurality of lamps for improving visibility of a character engraved on each button during a nighttime driving, tunnel driving and an indoor (e.g., parking lot) driving.

The vehicle further includes a rheostat switch capable of adjusting brightness of the light unit. An operation of the light unit is controlled by using any one of a resistance control type, a linear control type and a DC-DC switching control type.

The resistance control type has a simple circuit with a low cost. However the resistance control type is difficult to control the brightness of the light unit because the constant current control is impossible.

The DC-DC switching control type maintains a constant brightness of the light unit, even if the voltage fluctuates, and the DC-DC switching control type easily changes a design based on quantity of the lamp and a current of the lamp. However, the DC-DC switching control type has a complicated circuitry, high design cost, and low sensitivity to electromagnetic waves.

The linear control type maintains a constant brightness of the light unit, even if the voltage fluctuates, and has a simple circuit structure. However, the linear control type has a predetermined current value per one lamp, and requires a big PCB area due to heating.

Therefore, there is a need for a current control apparatus capable of stably supplying a current to the light unit while reducing the manufacturing cost.

SUMMARY

The present disclosure provides a current control apparatus having a wide current range, and a vehicle having the current control apparatus.

The present disclosure also provides a current control apparatus for connecting automatically a lamp to an output pin corresponding to a constant current within a constant error rate of the lamp, and a vehicle having the current control apparatus.

In accordance the present disclosure, a current control apparatus for a vehicle includes: a plurality of output pins configured to output currents of different values; an output signal feedback part connected to each of the plurality of output pins, and configured to generate one of a plurality of output feedback signals corresponding to each of the plurality of output pins; a reference signal generation part configured to generate one of a plurality of reference signals corresponding to each of a plurality of target outputs; a signal selection part configured to select one of the plurality of output feedback signals, and to select one of the plurality of reference signals; a comparator configured to receive the one of the plurality of output feedback signals, to receive the one of the plurality of reference signals, to compare the received output feedback signal to the received reference signal, and to output a signal difference between the received output feedback signal and the received reference signal; and a constant current driver configured to adjust a constant current output through one of the plurality of output pins based on the signal difference between the received output feedback signal and the received reference signal.

The reference signal generation part includes a first reference resistor, a second reference resistor connected to the first reference resistor in series, and a reference current portion connected in series or connected via current mirror circuit to the second reference resistor. The plurality of reference signals includes a first reference signal output through one end of the first reference resistor, and a second reference signal output through one end of the second reference resistor, wherein the end of the second reference resistor outputting the second reference signal is not adjacent to the first reference resistor. The output signal feedback part includes a first shunt resistor, and a second shunt resistor connected in series to the first shunt resistor. The plurality of output feedback signal includes a first output feedback signal output through one end of the first shunt resistor, and a second output feedback signal output through one end of the second shunt resistor, wherein the end of the second shunt resistor outputting the second output feedback signal is not adjacent to the first shunt resistor.

The signal selection part includes a first signal selector to connect a first input port of the comparator with one of the first reference signal and the second reference signal, and a second signal selector to connect a second input port of the comparator with one of the first output feedback signal and the second output feedback signal.

The plurality of output pins includes a first output pin to output the first current, and a second output pin to output a second current having a more accurate value in lower current range than a value of the first current. The first signal selector transmits the first reference signal to the first input port of the comparator when a load is connected to the first output pin, and transmits the second reference signal to the first input port of the comparator when the load is connected to the second output pin. The second signal selector transmits the first output feedback to the second input port of the comparator when the load is connected to the first output pin, and transmits the second output feedback signal to the second input port of the comparator when the load is connected to the second output pin.

The comparator compares a voltage of the first reference signal input to the first input port with a voltage of the first output feedback signal input to the second input port when the load is connected to the first output pin, amplifies and outputs a value of a difference between the voltage of the first reference signal and the voltage of the first output feedback signal, and compares a voltage of the second reference signal input to the first input port with a voltage of the second output feedback signal input to the second input port when the load is connected to the second output pin, amplifies and outputs a value of a difference between the voltage of the second reference signal and the voltage of the second output feedback signal.

The current control apparatus may further include a reference current portion configured to set at least one of the voltage of the first reference signal input corresponding to the first current, and a voltage of the second reference signal input corresponding to the second current.

The current control apparatus may further include a setting pin connected to each of the first signal selector and the second signal selector, and configured to change a switching state of the first signal selector and the second signal selector.

The setting portion is connected to the setting pin for configuring the setting pin voltage and deciding a switching state of the first signal selector and the second signal selector depending on the setting pin voltage.

In accordance with another aspect of the present disclosure, a vehicle includes: a lamp; and a current control apparatus connected to the lamp, and configured to constantly control a current flowing through the lamp. The current control apparatus includes: a plurality of output pins configured to output currents of different values; an output signal feedback part connected to each of the plurality of output pins, and configured to generate at least one of a plurality of output feedback signals corresponding to each of the plurality of output pins; a reference signal generation part configured to generate at least one of a plurality of reference signals corresponding to each of the plurality of target output; a signal selection part configured to select one of the plurality of output feedback signals, and to select one of the plurality of reference signals; a comparator configured to receive the one of the plurality of output feedback signals, to receive the one of the plurality of reference signals, to compare the received output feedback signal to the received reference signal, and to output a signal difference between the received output feedback signal and the received reference signal; and a constant current driver configured to adjust a constant current output through an output pin connected to the lamp, among the plurality of output pins based on the signal difference between the received output feedback signal and the received reference signal.

The reference signal generation part includes a first reference resistor, a second reference resistor connected to the first reference resistor in series, and a reference current portion connected in series or connected via current mirror circuit to the second reference resistor The plurality of reference signals includes a first reference signal output through one end of the first reference resistor, and a second reference signal output through one end of the second reference resistor, wherein the end of the second reference resistor outputting the second reference signal is not adjacent to the first reference resistor. The output signal feedback part includes a first shunt resistor, and a second shunt resistor connected in series to the first shunt resistor. The plurality of output feedback signal includes a first output feedback signal output through one end of the first shunt resistor, and a second output feedback signal output through one end of the second shunt resistor, wherein the end of the second shunt resistor outputting the second output feedback signal is not adjacent to the first shunt resistor.

The signal selection part includes a first signal selector to transmit one of the first reference signal and the second reference signal to a first input port of the comparator, and a second signal selector to transmit one of the first output feedback signal and the second output feedback signal to a second input port of the comparator.

The plurality of output pins includes a first output pin to output a first current, and a second output pin to output a second current having a more accurate value in lower current range than a value of the first current. The first signal selector transmits the first reference signal to the first input port of the comparator when a load is connected to the first output pin, and transmits the second reference signal to the first input port of the comparator when the load is connected to the second output pin. The second signal selector transmits the first output feedback signal to the second input port of the comparator when the load is connected to the first output pin, and transmits the second output feedback signal to the second input port of the comparator when the load is connected to the second output pin.

The comparator compares a voltage of the first reference signal input to the first input port with a voltage of the first output feedback signal input to the second input port when the load is connected to the first output pin, amplifies and outputs a value of a difference between the voltage of the first reference signal and the voltage of the first output feedback signal, and compares a voltage of the second reference signal input to the first input port with a voltage of the second output feedback signal input to the second input port when the load is connected to the second output pin, amplifies and outputs a value of a difference between the voltage of the second reference signal and the voltage of the second output feedback signal.

The vehicle may further include a reference current portion configured to set a reference current; a current regulator configured to generate a mirrored reference current. The reference signal generation part configured to generate a first reference signal and a second reference signal. The setting portion is connected to the setting pin for configuring the setting pin voltage and deciding a switching state of the first signal selector and the second signal selector depending on the setting pin voltage.

The vehicle may further include a setting pin connected to each of the first signal selector and the second signal selector, and configured to change a switching state of the first signal selector and the second signal selector. The first signal selector and the second signal selector are changed to a first switching state when the setting pin is in an open state, and the first signal selector and the second signal selector are changed to a second switching state when the setting pin is in a ground state.

The vehicle may further include an output selector selectively connected to one of the first output pin and the second output pin; a current detector configured to detect a current of the lamp; and a controller configured to allow the setting pin to be in the open state, to control the output selector so that the lamp is connected to the first output pin when a setting command is received, to maintain a state of the setting pin and a state of output selector when the detected current is greater than or equal to a predetermined set current, to change the state of the setting pin to a ground state, and to control the output selector so that the lamp is connected to the second output pin when the detected current is less than the predetermined set current.

The controller receives the comparison signal of the comparator, and controls a turn on operation or a turn off operation of the constant current driver based on the received comparison signal.

In accordance with another aspect of the present disclosure, a vehicle includes: a light unit having a plurality of lamps; a driver having a plurality of current control apparatuses connected to each of the plurality of lamps; and a controller configured to transmit an operation command of at least one of the plurality of lamps to the driver, where each of current control apparatuses of the driver includes: a plurality of output pins configured to output currents of different values; an output signal feedback part configured to generate an output feedback signal corresponding to one of the plurality of output pins when the operation command is received, wherein the one of the plurality of output pin is connected to the lamp; and a constant current driver configured to adjust a constant current of the lamp based on the output feedback signal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
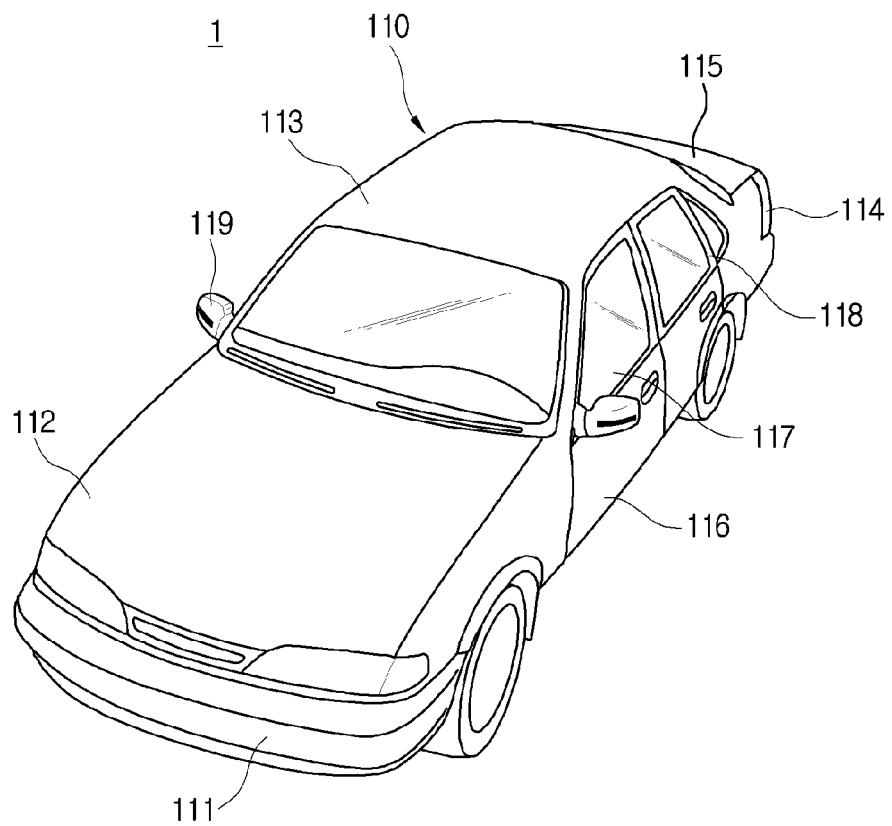
FIG. 1 is a perspective view of an exterior of a vehicle in accordance with one embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the exemplary embodiments of the present disclosure, examples of which are illustrated in the accompanying drawings, wherein like reference numerals refer to like elements throughout.

Figure 2:
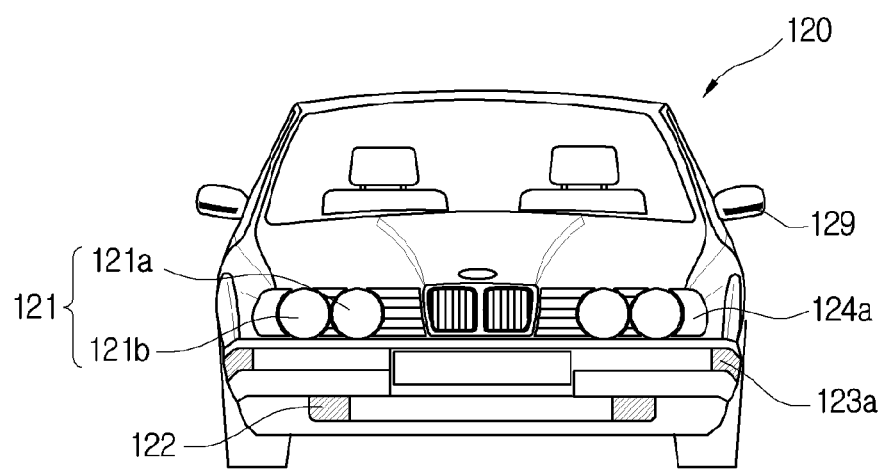
FIG. 2 is a view illustrating a light unit provided in a front portion of the exterior of the vehicle in accordance with the embodiment of the present disclosure.
Figure 3:
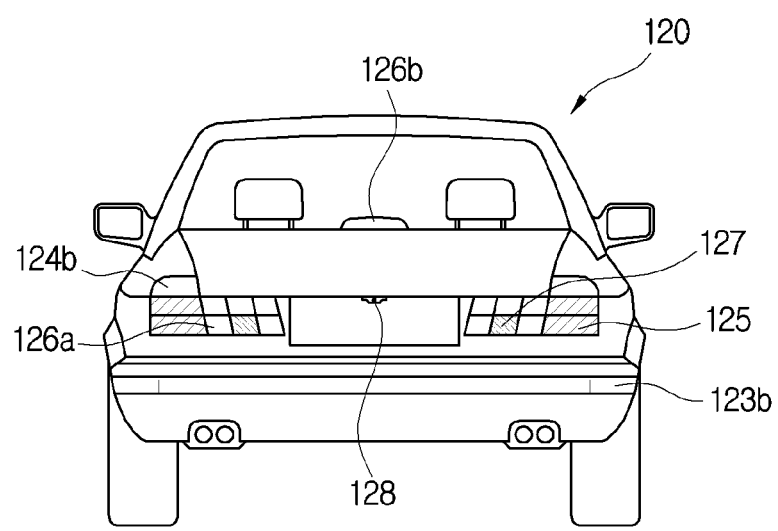
FIG. 3 is a view illustrating a light unit provided in a rear portion of the exterior of the vehicle in accordance with the embodiment of the present disclosure.
Figure 4:
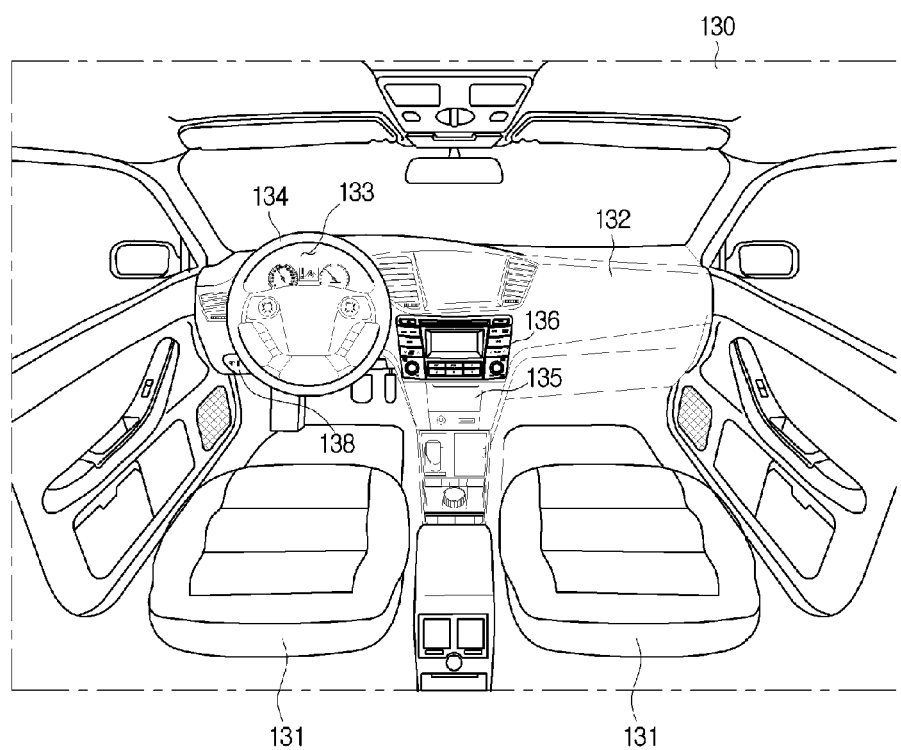
FIG. 4 is a view illustrating an internal structure of the vehicle in accordance with the embodiment of the present disclosure.
Figure 5:
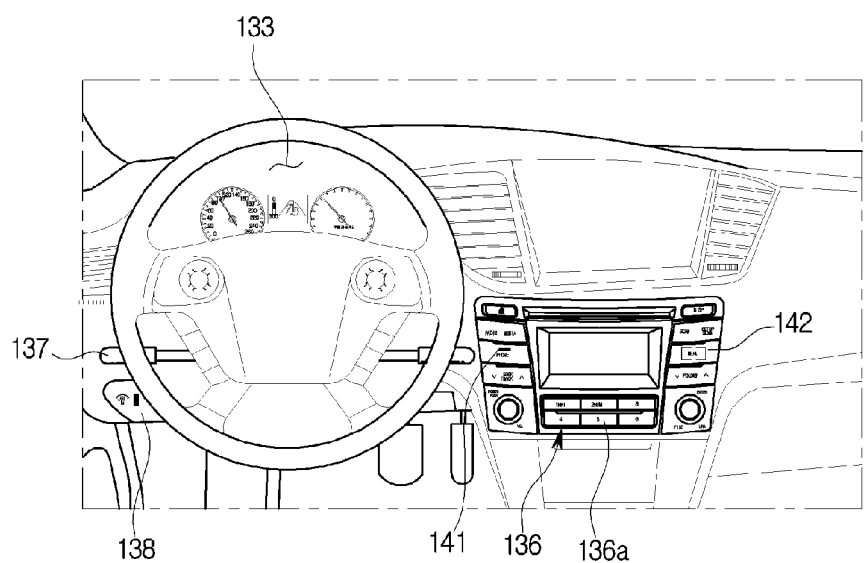
FIG. 5 is a view illustrating a light unit provided in a cluster and a center fascia of the vehicle in accordance with the embodiment of the present disclosure.

FIG. 1 is a perspective view of an exterior of a vehicle in accordance with one embodiment of the present disclosure. FIG. 2 is a view illustrating a light unit provided in a front portion of the exterior of the vehicle in accordance with the embodiment of the present disclosure. FIG. 3 is a view illustrating a light unit provided in a rear portion of the exterior of the vehicle in accordance with the embodiment of the present disclosure. FIG. 4 is a view illustrating an internal structure of the vehicle in accordance with the embodiment of the present disclosure. FIG. 5 is a view illustrating a light unit provided in a cluster and a center fascia of the vehicle in accordance with the embodiment of the present disclosure.

A vehicle 1 includes a body having an interior and an exterior 110, and a chassis which is a remaining portion other than the body and is equipped with mechanisms required for driving thereof.

Referring to FIG. 1, the exterior 110 of the body includes a front panel 111, a hood 112, a roof panel 113, a rear panel 114, a trunk 115, front-rear and left-right doors 116, and a plurality of window glasses 117 respectively installed in the front, rear, left, and right doors 115 to be openable and closable.

Also, the exterior 110 of the body further includes a plurality of pillars 118 provided at the borders between the front, rear, left and right doors 115 and the window glasses 117. The exterior 110 of the body further includes a plurality of side-view mirrors 119 to provide a driver (that is, passenger) with the rear view of the vehicle 1.

The vehicle includes a light unit 120 to enable the driver to easily see information of surroundings while keeping his/her eyes forward, and to perform a function of signaling or communicating with other vehicles and pedestrians.

The light unit 120 includes a plurality of lamps installed in front part and rear part of the vehicle 1.

The plurality of lamps includes an illuminating lamp to illuminate a long distance of a front direction, a short distance of the front direction and a rear direction; a signal lamp to inform a brake, a change of direction and an emergency situation; and an indicator lamp to indicate the breadth of the vehicle 1, the height of the body, license plate and parking.

This will be described with reference to FIGS. 2 and 3.

Referring to FIG. 2, the plurality of lamps provided in the front part of the exterior of the vehicle 1 includes a head lamp 121 configured to emit light toward the front direction of the road, a fog lamp 122 configured to allow the driver to find the direction by emitting light toward the front direction of the road and a shoulder of the road when it is foggy, a side lamp 123a configured to indicate a boundary of the vehicle and a breadth of the vehicle 1, and a directional signal lamp 124a configured to indicate a change of direction when changing the direction of the vehicle.

The head lamp 121 includes a high beam lamp 121a configured to emit light the long distance (e.g., about 100 m) of the road, and a low beam lamp 121b configured to output light the short distance (e.g., about 30 m) of the road.

Referring to FIG. 3, the plurality of lamps provided in the rear part of the exterior of the vehicle includes a side lamp 123b configured to indicate the boundary of the vehicle and the breadth of the vehicle, a directional signal lamp 124b configured to indicate a change of direction when changing the direction of the vehicle, a tail lamp 125 provided in the rear panel 114 and configured to emit light in the rear direction, and to automatically perform lighting operation when the head lamp is turned on, a brake lamp 126a configured to inform a braking action to a vehicle in the rear side when a brake pedal is pressed by the driver, and a back-up lamp 127 configured to warn a dangerous situation to vehicles in the rear side or pedestrians when backing up the vehicle 1.

The light unit 120 provided in the rear part of the exterior of the vehicle may further include a brake lamp 126b provided adjacent to the rear window glass, and to inform the braking action to the vehicle in the rear side when the brake pedal is pressed by the driver, and a license plate lamp 128 configured to emit light toward the license plate of the vehicle 1.

The light unit 120 may further include an auxiliary lamp 129 provided in the front part of the exterior, particularly provided in the front surface of the plurality of side-view mirrors 119.

The auxiliary lamp 129 may be a light emitting diode (LED) provided in the side mirror to inform the braking action or the direction change, and may be an additional light emitting diode (LED) additionally provided in the side mirror 119 to indicate the breadth of the vehicle.

The plurality of lamps performing the same function may be arranged in pairs on the left and right of the front and rear of the vehicle.

Referring to FIG. 4, the interior 130 of the body includes seats 131 on which a driver and a passenger are seated; a dashboard 132; an instrument panel (i.e., a cluster) 133 arranged on the dashboard 132, and to output information related to driving and information of the vehicle of a tachometer, a speedometer, a coolant thermometer, a fuel gauge and the like; a steering wheel 134 to operate a driving direction of the vehicle; and a center fascia 135 including an air vent of the air conditioner, a control panel, and an audio device.

The interior 130 of the body includes a head unit 136 located in the center fascia 135, to receive operation commands from the audio device and the air conditioner. The interior 130 of the body may include an interior light unit 140. This will be described with reference to FIG. 5.

Referring to FIG. 5, the light unit 140 provided in the interior 130 of the vehicle includes the plurality of lamps provided in the cluster 133 and the head unit 136.

The cluster 133 includes a lamp for indicating the coolant thermometer, a lamp for indicating the fuel gauge, a lamp for indicating the direction change, a lamp for indicating an operation of the high beam indicator light, a seat belt warning lamp, a lamp for indicating an automatic transmission shift, a door open warning lamp, an engine oil warning lamp, a fuel shortage warning lamp, a lamp for indicating a mileage, and a lamp for indicating an odometer.

The cluster 133 may further include a plurality of character lamps for improving visibility of a character engraved on the tachometer, a character engraved on the speedometer and the like.

The head unit 136 may include a plurality of buttons 136a configured to receive an input of a command of a user for controlling the audio device, the air conditioner, a Bluetooth device, a hot wire of the seat, and the like.

The head unit 136 includes an operation lamp 141 provided in at least one of the plurality of buttons, and configured to indicate an operation state of a function corresponding to the button, and a character lamp 142 provided on each of the plurality of buttons, and configured to improve visibility of a character engraved on each button.

Here, the operation state of the function includes an ON state and an OFF state. At this time, the lamp of the light unit may be turned on or off in correspondence with the operation state of the function.

The vehicle further includes a lamp lever 139 configured to instruct an operation of the head lamp, the fog lamp, the directional signal lamp, and to select an auto mode of the lamp.

The chassis of the vehicle 1 may include a power generation apparatus, a power transmission apparatus, a driving apparatus, a steering apparatus, a brake apparatus, a suspension apparatus, a transmission apparatus, a fuel supply apparatus, left/right front and rear wheels, and the like.

The vehicle 1 may also be provided with various safety apparatuses for the safety of the driver and passengers. Examples of the safety apparatus of the vehicle 1 include an airbag control apparatus for the purpose of safety of the driver and passengers in a collision of the vehicle 1 and an electronic stability control (ESC) to control a balance of the vehicle 1 during acceleration or cornering.

The vehicle 1 further includes a battery (not shown) configured to supply power for operating various components installed in the vehicle 1. The battery is charged using a self-generator or the engine's power during driving.

The plurality of lamps provided in the interior and the exterior of the vehicle may include at least one light emitting diode (LED) or at least one light emitting diode (LED) array.

Figure 6:
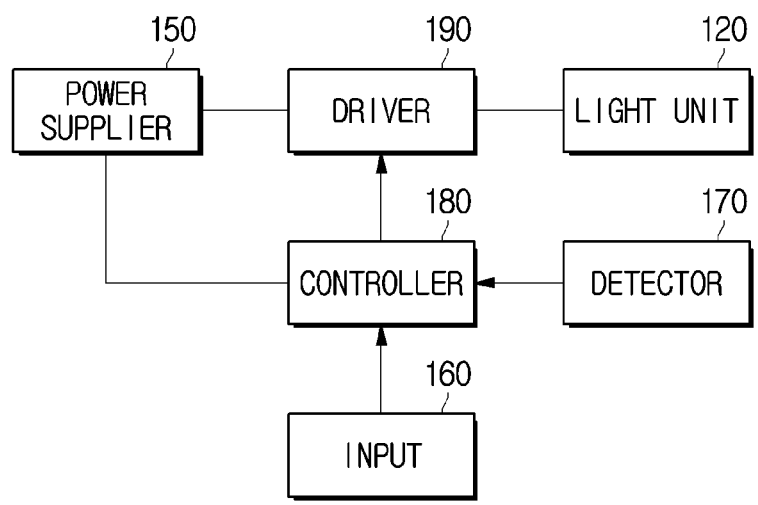
FIG. 6 is a block diagram of a light control apparatus for controlling a light unit provided in the vehicle in accordance with the embodiment of the present disclosure.

FIG. 6 is a block diagram of a light control apparatus for controlling a light unit provided in the vehicle in accordance with the embodiment of the present disclosure.

A light control apparatus 2 includes the light unit 120, a power supplier 150, an input 160, a detector 170, a controller 180, and a driver 190.

The light unit 120 includes the plurality of lamps. The lamps may be lamps provided in the exterior 110 of the vehicle 1, and may be lamps provided in the interior 130 of the vehicle 1.

The lamps may be a light emitting diode (LED). The lamps may include LED arrays. The LED arrays may be a plurality of LEDs connected in series, parallel, or series-parallel.

The power supplier 150 is connected to a battery (not shown), receives power from the battery, converts the received power into a power for operating various components installed in the vehicle1, and provides the converted power to each component. The power supplier 150 may be connected to an external commercial AC power source.

The input 160 may be receive a lamp-ON command and a lamp-OFF command, and may be receive an automatic ON-OFF command. The input 160 may be a button located in the center fascia 135 or the head unit 136, or may be the lamp lever 139.

The detector 170 may include an illuminance detector to detect external illuminance, and a pressure detector to detect a pressure applied to the brake pedal.

The controller 180 transmits the lamp-ON command to the driver 190 when the lamp-ON command is received through the input 160. The controller 180 compares the detected illuminance to the reference illuminance when an automatic ON-OFF command is received, transmits the ON command to the driver 190 when the detected illuminance is lower than or equal to the reference illuminance, and transmits the OFF command to the driver 190 when the detected illuminance is higher than the reference illuminance.

For example, the controller 180 transmits a head lamp-ON command when the lamp of the light unit is the head lamp, and transmits a directional signal lamp-ON command when the lamp of the light unit is the directional signal lamp.

The controller 180 transmits the lamp-OFF command to the driver 190 when the lamp-OFF command is received through the input 160.

The controller 180 determines whether or not the brake pedal is applied, based on the pressure detected by the pressure detector when the lamp of the light unit is the brake lamp, and when the controller determines that the brake pedal is applied, the controller 180 transmits the lamp-ON command to the driver 190.

The controller 180 transmits a signal selection command to a current control apparatus of the driver 190 to select a signal corresponding to a capacity of constant current to be applied to the lamp. The capacity of constant current includes value of constant current.

That is, the controller 180 may include a setting portion 180a for setting a switching state of a signal selection part based on the capacity of the set constant current.

The setting portion 180a may be connected to a setting pin of the current control apparatus of the driver, and transmits a switching signal of the signal selection part corresponding to the capacity of the set constant current to the current control apparatus through the setting pin of the current control apparatus.

For example, when the light control apparatus constantly outputs a first current and a second current and setting information for setting one of the first current and the second current is received by a communicator (not shown) or a separately provided input (not shown), the setting portion 180a may transmit the switching signal of the signal selection part corresponding to the received setting information to the driver 190.

The signal selection part is in a first switching state when the first current is set, and the signal selection part is in a second switching state when the second current is set. In this case, the setting portion 180a transmits a first switching signal to the driver when the set constant current is the first current, and transmits a second switching signal to the driver when the set constant current is the second current.

The setting portion 180a may transmit a switching signal of the switch to the signal selection part through the setting pin of the current control apparatus.

The setting portion 180a may change the switching state of the signal selection part by changing the setting state of the setting pin based on the connection configuration of the setting pin and the signal selection switch.

For example, the setting portion 180a may allow the setting pin to be in a ground state so that the signal selection part is in the first switching state, and may allow the setting pin to be in an open state so that the signal selection part is in the second switching state.

The setting portion 180a allows the setting pin to be in the open state or the ground state so that the current applied to the lamp is maintained constant.

The open state may be a circuit-open state, and the ground state may be connected to a ground of the circuit. The driver 190 provides a constant current to at least one lamp to drive the at least one lamp.

The capacity of the constant current may vary depending on a function of the lamp provided in the light unit.

The setting portion 180a is connected to the setting pin for configuring the setting pin voltage and deciding a switching state of the first signal selector and the second signal selector depending on the setting pin voltage.

The driver 190 may include an integrated circuit (IC). The integrated circuit may be the current control apparatus configured to constantly control the current of the lamp.

The current control apparatus may control the output of a plurality of currents having different capacities. One of the plurality of currents may optionally be used for operation the lamp.

The driver 190 may include a number of current control apparatuses corresponding to a number of lamps provided in the light unit.

That is, the number of lamps in the light unit and the number of the current control apparatuses may be equal.

The capacity of current output by the plurality of current control apparatuses provided in the driver may be equal or different according to the function of the lamp provided in the light unit. The capacity of current may include the value of current.

That is, the driver 190 may include the plurality of current control apparatuses to control each of the plurality of lamps.

Figure 7:
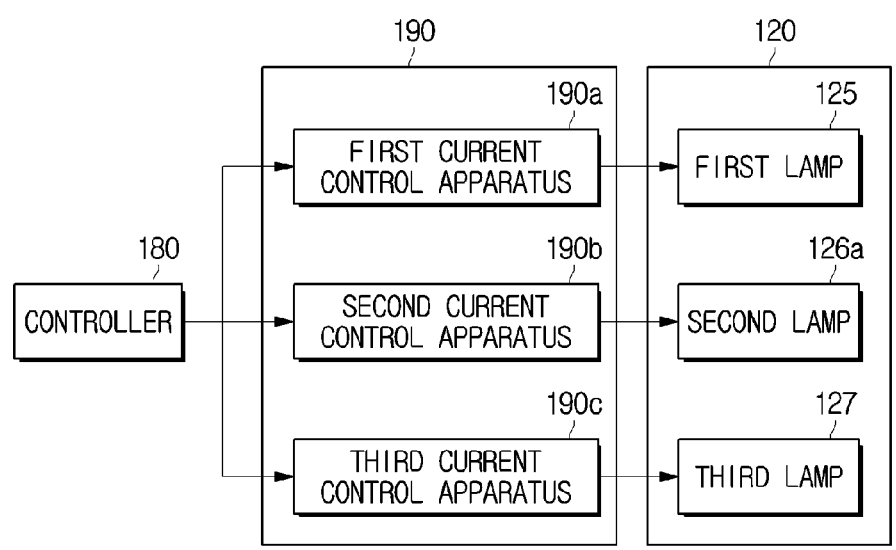
FIG. 7 is a detailed diagram of a driver of the light control apparatus shown in FIG. 6.

The driver 190 will be described with reference to FIG. 7.

It is assumed that the light unit 120 driven by the driver includes a first lamp corresponding to the tail lamp 125, a second lamp corresponding to the braking lamp 126a, and a third lamp corresponding to the backup lamp 127. It is assumed that among the first lamp, the second lamp and the third lamp, a brightness of the first lamp is the darkest brightness and a brightness of the third lamp is the brightest brightness.

The driver 190 may include a first current control apparatus 190a for controlling the first lamp 125, a second current control apparatus 190b for controlling the second lamp 126a, and a third current control apparatus 190c for controlling the third lamp 127.

The first current control apparatus 190a outputs a first current to maintain the brightness of the first lamp 125 at the first brightness, and controls the value of first current outputted to be constantly maintained at the value of first current.

The first current control apparatus 190a may output the plurality of currents having different capacities and may include the plurality of output pins to output the plurality of currents, respectively. Accordingly, the first lamp may be connected to the output pin that outputs the first current corresponding to the constant current required for driving the first lamp among the plurality of output pins of the first current control apparatus.

The second current control apparatus 190b outputs the second current to maintain the brightness of the second lamp 126a at the second brightness, and controls the value of second current outputted to be constantly maintained at the value of second current.

The second current control apparatus 190b may output the plurality of currents having different capacities, and may include the plurality of output pins to output the plurality of currents, respectively. Accordingly, the second lamp may be connected to the output pin that outputs the second current corresponding to the constant current required for driving the second lamp among the plurality of output pins of the second current control apparatus.

The third current control apparatus 190c outputs a third current to maintain the brightness of the third lamp 127 at the third brightness, and controls the value of third current outputted to be constantly maintained at the value of third current.

The third current control apparatus 190c may output the plurality of currents having different capacities, and may include the plurality of output pins to output the plurality of currents, respectively. Accordingly, the third lamp may be connected to the output pin that outputs the third current corresponding to the constant current required for driving the third lamp among the plurality of output pins of the third current control apparatus.

The plurality of output pins includes a first output pin to output the first current, and a second output pin to output a second current having a more accurate value in lower current range than a value of the first current.

The first current has an accuracy of constant current control higher than that of the second current at a relatively large output, and the second current has an accuracy of constant current control higher than that of the first current at a relatively small output.

The first current control apparatus 190a, the second current control apparatus 190b and the third current control apparatus 190c differ only in the value of the output current, and the structure thereof is the same.

Therefore, the configuration of the first current control apparatus 190a will be described.

The first current control apparatus 190a will be described with reference to FIG. 8.

Figure 8:
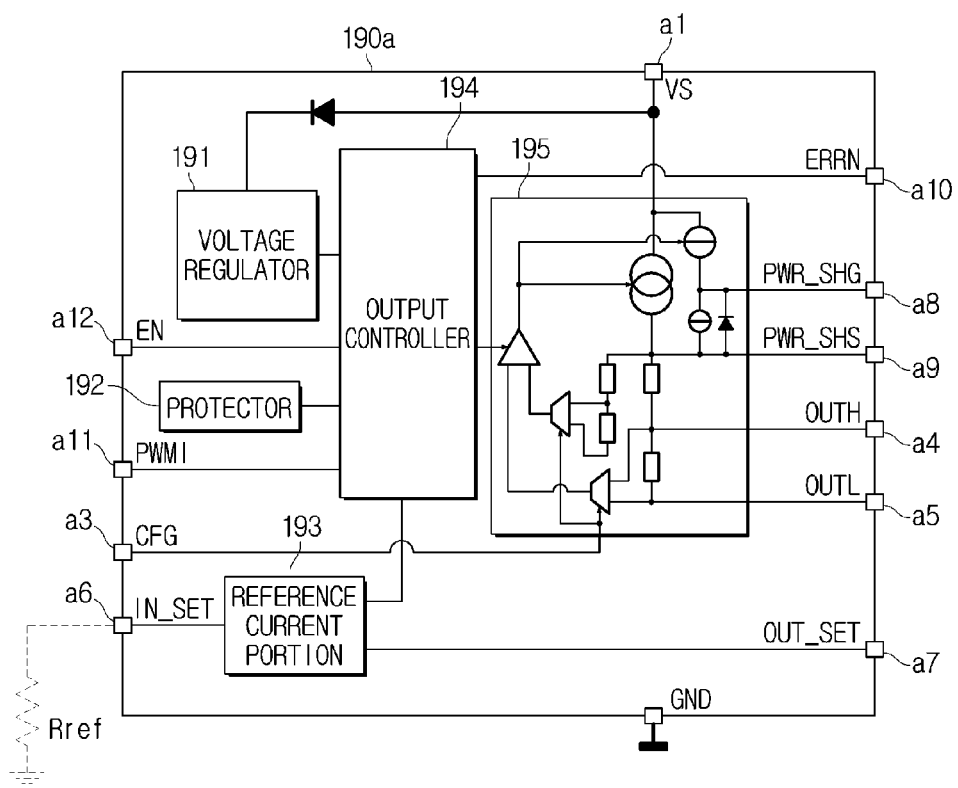
FIG. 8 is a detailed diagram of a current control apparatus shown in FIG. 7.

Referring to FIG. 8, the first current control apparatus 190a includes a voltage regulator 191, a protector 192, a reference current portion 193, an output controller 194 and a current regulator 195.

The first current control apparatus 190a may be an integrated circuit (IC). The first current control apparatus 190a may include a plurality of pins a1 to a12 to electrically connect internal components of the integrated circuit and the power supplier 150, the controller 180 and the light unit 120, which are external components.

The plurality of pins may include a voltage pin to which an external voltage is applied, a ground pin, a setting pin to set the switching state of the signal selection switch, a plurality of output pins to output the plurality of currents of different values, a reference current IN_SET pin to set a reference current, and a control pin to transmit and receive information with the controller 180.

Referring to FIG. 8, the plurality of pins includes a voltage pin a1 to which the external voltage is applied, a ground pin a2, a setting pin a3 to set the switching state of the signal selection switch, a first output pin a4 to output the first current, a second output pin a5 to output the second current less than the first current, an IN_SET pin a6 to set the input current as a reference current, an OUT_SET pin a7 to set the output current as the reference current, and a plurality of pins a8 to a12. At least one of the plurality of pins a8 to a12 may be set as the control pin.

The setting pin a3 may allow the signal selection part to be switched to the first switching state based on an external switching signal, or may allow the signal selection part to be switched to the second switching state based on the external switching signal.

The voltage regulator 191 receives a voltage Vs applied to an internal of the first current control apparatus, converts the supplied voltage into a voltage necessary for driving the output controller 194, and supplies the converted voltage to the output controller 194.

The protector 192 may further include a temperature sensor to detect a temperature of the first current control apparatus, and transmits information for adjusting the current to the output controller 194 when the detected temperature is equal to or higher than a predetermined temperature. At this time, the output controller 194 controls an operation of the current regulator 195 so that the output value of current is adjusted.

The protector 192 may detect a temperature of the first current control apparatus, and may transmit the detected temperature to the output controller 194. At this time, the output controller 194 may compare the received temperature to the predetermined temperature, and may control the operation of the current regulator 195 so that the output value of current is adjusted when the detected temperature is equal to or higher than the predetermined temperature.

The reference current portion 193 generates a reference current by using a resistor connected to the IN_SET pin a6, and transmits information corresponding to the reference current to the output controller 194 or the current regulator 195.

The reference current of the reference current portion 193 is related with a mirrored reference current (see, e.g., FIG. 10, Iref) of the current regulator 195 by use of a current mirror circuit.

That is, a reference current generated from the reference current portion 193 corresponds to a current being output through the first output pin a4 or the second output pin a5.

The reference current generated from the reference current portion 193 is mirrored on the current regulator 195 such that a first reference signal and a second reference signal are generated.

The reference current includes the first reference current corresponding to the first current, and the second reference current corresponding to the second current. The reference current may be current that is maintained with constant values.

The reference current portion connected in series to the second reference resistor and mirroring IN_SET reference current by the reference current portion.

The reference current portion connected in series or connected via current mirror circuit to the second reference resistor.

The reference current portion configured to set at least one of the voltage of the first reference signal input corresponding to the first current, and the voltage of the second reference signal input corresponding to the second current.

The reference current portion 193 is connected to an external setting resistor Rref, and may set the reference current based on the resistance value of the setting resistor.

That is, the resistance value of the setting resistor may be determined based on the constant current required in the lamp.

The setting resistor for setting the reference current may be provided inside the reference current portion 193.

The output controller 194 receives the lamp ON and OFF command transmitted from the external controller 180, and transmits an operation command to the current regulator 195 based on the received command.

That is, the output controller 194 transmits an operation command to the current regulator 195 so that a constant current is supplied to the lamp connected to the output pin when the lamp-ON command is received, and transmits an operation stop command to the current regulator 195 so that the lamp connected to the output pin is turned off when the lamp-OFF command is received.

The output controller 194 receives an output signal of the comparator of the current regulator 195, and controls an operation of turning on and turning off of the constant current driver according to the received output signal.

The output controller 194 may include a constant current controller 194a for controlling a turn-on operation and a turn-off operation of the constant current driver.

Figure 10:
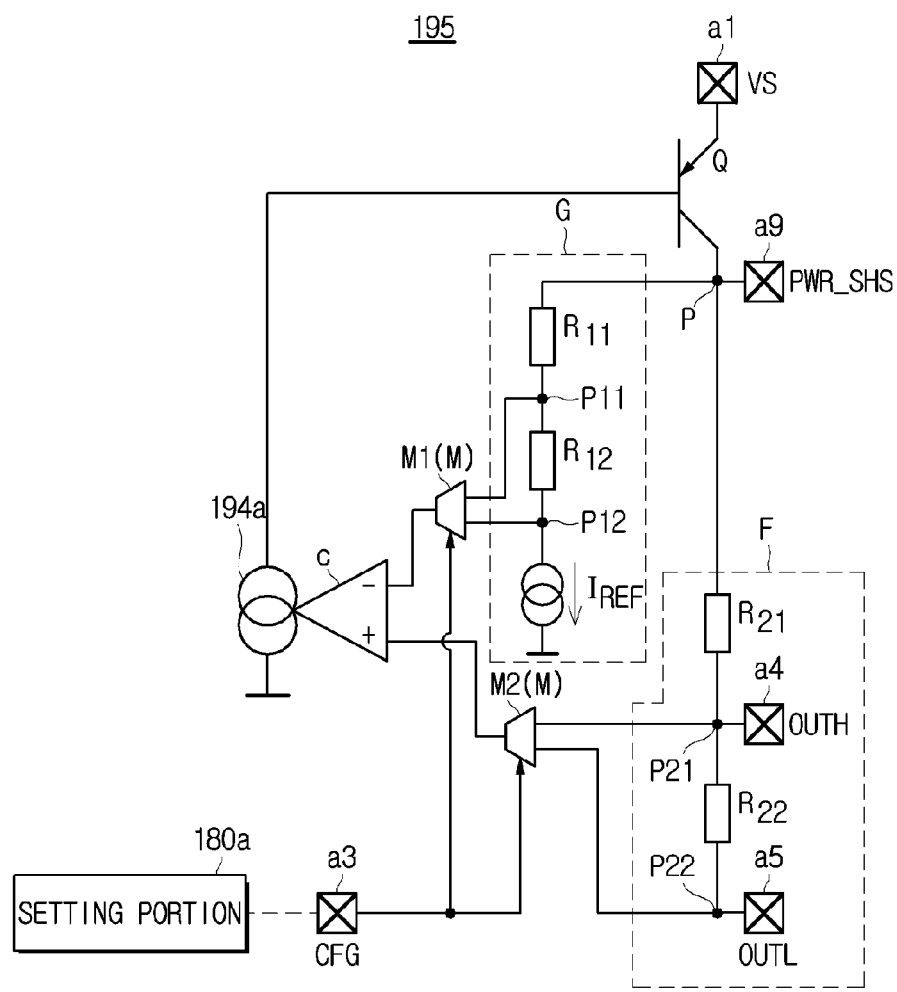
FIG. 10 is a detailed diagram of a current regulator shown in FIG. 9.

The current regulator 195 is configured to generate a mirrored reference current (see, e.g., FIG. 10, iref).

The current regulator 195 constantly adjusts the current of the lamp connected to any one of the plurality of output pin.

The current regulator will be described with reference to FIG. 9.

Figure 9:
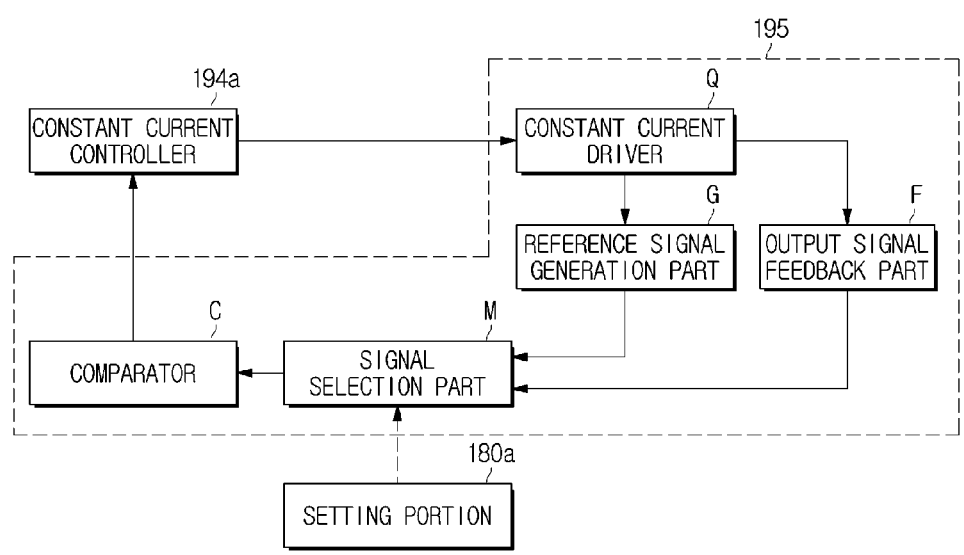
FIG. 9 is a control block diagram of the current control apparatus shown in FIG. 8.

FIG. 9 is a control block diagram of the current control apparatus.

Referring to FIG. 9, the current regulator 195 includes a reference signal generation part G, an output signal feedback part F, a signal selection part M, a comparator C and a constant current driver Q.

The reference signal generation part G generates a reference signal.

The reference signal generation part G may be a reference signal generator.

The reference signal generation part G is configured to generate one of a plurality of reference signals corresponding to each of a plurality of target outputs. The reference signal generation part G generates a reference signal of the current output through the output pin among the plurality of currents of different values. The generated reference signal may be transmitted to the comparator C through the signal selection switch.

The reference signal generation part G includes a reference sensing point for generating the reference signal. The number of the reference sensing points may correspond to the number of values of the output current. A position of the reference sensing point may differ from each other depending on the value of the output current.

The reference signal generation part G may include the plurality of resistors.

The output signal feedback part F generates an output feedback signal of the current output through the output pin among the plurality of currents of different values. The generated output feedback signal may be transmitted to the comparator through the signal selection switch.

The output signal feedback part F includes an output sensing point for sensing the output feedback signal. The number of the output sensing points may correspond to the number of values of the output current. A position of the output sensing point may differ from each other depending on the value of the output current.

The output signal feedback part F may include the plurality of resistors.

The signal selection part M may be a signal selection switch.

The signal selection part M changes the switching state based on the switching signal of the setting portion 180a, transmits the reference signal received from the reference signal generation part G to the comparator based on the changed switching state, and transmits the output feedback signal received from the output signal feedback part to the comparator based on the changed switching state.

The signal selection part M may include the number of a signal selectors corresponding to the number of outputable current value.

The signal selector of the signal selection part may include the number of a switching states corresponding to the number of outputable current value.

For example, the signal selector may include three switching states when the number of outputable current value are three, and may include five switching states when the number of outputable current value are five.

The signal selector may include a multiplexer.

The comparator C may be provided using an amplifier. The comparator amplifies and outputs a value of a difference between the reference signal and the output feedback signal, and the output of the comparator C is transmitted to a constant current driver Q such that the constant current driver Q outputs a constant current.

In other words, the comparator C amplifies and outputs a value of a difference between the reference signal and the output feedback signal.

The comparator C compares the reference signal with the output feedback signal, and outputs a signal corresponding to a result of a comparison.

The comparator C outputs a high signal when a value of output feedback signal is greater than or equal to a value of reference signal, and outputs a low signal when the value of output feedback signal is less than the value of reference signal.

The reference signal and the output feedback signal each may be a voltage signal.

The constant current driver Q performs the turn-on and the turn-off based on the control command of the constant current controller 194a, thereby maintaining the value of current outputted through the output pin constant.

The constant current driver Q may include a switch element.

A circuit configuration of the current regulator will be described with reference to FIG. 10. The output current including two values will be used as examples for explanation.

FIG. 10 is a detailed diagram of the current regulator.

The current regulator 195 adjusts the first current output through the first output pin a4 constantly, and adjusts the second current output through the second output pin a5 constantly.

The value of the first current outputted through the first output pin a4 may be greater than the value of the second current outputted through the second output pin a5.

That is, the first output pin a4 may be connected to the lamp operated by the first current. The second output pin a5 may be connected to the lamp operated by the second current having the value less than the value of first current.

The current regulator 195 includes the constant current driver Q, the reference signal generation part G and the output signal feedback part F. An emitter terminal of the constant current driver Q is connected to a voltage pin a1, a base terminal of the constant current driver Q is connected to the comparator C, and a collector terminal of the constant current driver Q is connected to the reference signal generation part G and the output signal feedback part F. The reference signal generation part G and the output signal feedback part are connected in parallel to each other in the collector terminal of the constant current driver Q.

The reference signal generation part G includes a first reference resistor R11 and a second reference resistor R12 connected in series. The output signal feedback part F includes a first shunt resistor R21 and a second shunt resistor R22 connected in series.

The first and second shunt resistors R21 and R22 connected in series with the first and second reference resistors R11 and R12 connected in series may be connected in parallel between the constant current driver Q and the comparator C.

The resistance value of the first reference resistor R11 may be equal to the resistance value of the first shunt resistor R21, and the resistance value of the second reference resistor R12 may be equal to the resistance value of the second shunt resistor R22. Thus, the current output through the output pin may be kept equal to the reference current.

A ratio of the resistance value of the first reference resistor R11 to the resistance value of the first shunt resistor R21 may be constant. A ratio of the resistance value of the second reference resistor R12 to the resistance value of the second shunt resistor R22 may be constant.

The reference signal generation part G may include a first reference sensing point P11 located at one end of the first reference resistor R11, and a second reference sensing point P12 located at one end of the second reference resistor R12.

The one end of the second reference resistor R12 may include the end that is not adjacent to the first reference resistor R11.

The output signal feedback part F may include a first output sensing point P21 located at one end of the first shunt resistor R21, and a second output sensing point P22 located at one end of the second shunt resistor R22.

The one end of the second shunt resistor R22 may include the end that is not adjacent to the first shunt resistor R21.

The first output sensing point of the output signal feedback part F may be connected to the first output pin a4. The first output sensing point P21 of the output signal feedback part F may be connected to the second output pin a5.

The current regulator 195 further includes a first signal selector M1 to select one of the plurality of reference sensing points of the reference signal generation part G, a second signal selector M2 for selecting one of the plurality of output sensing points of the output signal feedback part F, and the comparator C connected to an output port of the first signal selector M1 and an output port of the second signal selector M2.

The first and second signal selectors M1 and M2 may include a multiplexer.

That is, the input port of the first signal selector M1 may be connected to the first reference sensing point P11 disposed at one end of the first reference resistor R11 and the second reference sensing point P12 disposed at one end of the second reference resistor R12.

The input port of the second signal selector M2 may be connected to the first output sensing point P21 disposed at one end of the first shunt resistor R21 and the second output sensing point P22 disposed at one end of the second shunt resistor R22.

The output port of the first signal selector M1 and the output port of the second signal selector M2 may be connected to the first and second input ports of the comparator C, respectively.

The comparator C may output the high signal when the value of the output feedback signal received by the second signal selector is greater than or equal to the value of the reference signal received through the first signal selector, and may output the low signal when the value of the output feedback signal received by the second signal selector is less than the value of the reference signal received through the first signal selector.

An output port of the comparator C may be connected to the constant current controller 194*a*.

That is, the comparator C outputs at least one of the high signal and/or the low signal which is the comparison signal, to the constant current controller 194*a*.

The comparator C may be connected to the gate terminal of the constant current driver Q. The constant current driver Q may include a PNP transistor.

The collector terminal of the constant current driver Q may be connected to the first reference resistor R11 and the first shunt resistor R21.

The gate terminal of the constant current driver Q may be connected to the constant current controller 194*a*.

The first signal selector M1 allows the first reference sensing point P11 to be connected to the first input port of the comparator C when the setting pin a3 is in the open state, and allows the second reference sensing point P12 to be connected to the first input port of the comparator C when the setting pin a3 is in the ground state.

In particular, allowing the first reference sensing point P11 to be connected to the first input port of the comparator C includes allowing the voltage of both ends of the first reference resistor R11 to be input to the first input port of the comparator.

Also, allowing the second reference sensing point P12 to be connected to the first input port of the comparator C includes allowing the voltage of both ends of the first reference resistor R11 and the second reference resistor R12 connected in series each other to be input to the first input port of the comparator.

The second signal selector M2 allows the first output sensing point P21 to be connected to the second input port of the comparator C when the setting pin a3 is in the open state, and allows the second output sensing point P22 to be connected to the second input port of the comparator C when the setting pin a3 is in the ground state.

The comparator C may include the first input port as an inverting input port (−), and may include the second input port as a non-inverting input port (+).

In particular, allowing the first output sensing point P21 to be connected to the second input port of the comparator C includes allowing the voltage of both ends of the first shunt resistor R21 to be input to the non-inverting input port of the comparator. The allowing the second output sensing point P22 to be connected to the second input port of the comparator C includes allowing the voltage of both ends of the first shunt resistor R21 and the second shunt resistor R22 connected in series each other to be input to the non-inverting input port of the comparator.

When the setting pin a3 is in the open state, the comparator C compares a voltage of the first reference sensing point P11 with a voltage of the first output sensing point P21, and outputs a comparison signal corresponding to a comparison result. The comparison signal corresponding to a comparison result includes a signal having amplitude.

The comparison signal may include a signal difference between the received output feedback signal and the received reference signal.

When the setting pin a3 is in the ground state, the comparator C compares a voltage of the second reference sensing point P12 with a voltage of the second output sensing point P22, and outputs a comparison signal corresponding to a comparison result.

The comparator C outputs the first signal or the second signal based on the comparison result of the two voltages of the first input port and the second input port.

The comparator C may be provided using an amplifier. The comparator amplifies and outputs a value of a difference between the reference signal and the output feedback signal, and the output of the comparator C is transmitted to a constant current driver Q such that the constant current driver Q outputs a constant current.

The first signal may be the high signal. The second signal may be the low signal.

For example, the comparator C outputs the first signal when the setting pin a3 is in the open state and the voltage of the first output sensing point P21 is equal to or greater than the voltage of the first reference sensing point P11, and outputs the second signal when the setting pin a3 is in the open state and the voltage of the first output sensing point P21 is less than the voltage of the first reference sensing point P11.

The comparator C outputs the first signal when the setting pin a3 is in the ground state and the voltage of the second output sensing point P22 is equal to or greater than the voltage of the second reference sensing point P12, and outputs the second signal when the setting pin a3 is in the ground state and the voltage of the second output sensing point P22 is less than the voltage of the second reference sensing point P12.

The constant current driver Q is turned off when the high signal is received through the base terminal, thereby not allowing current to flow through the collector terminal. The constant current driver Q is turned on when the low signal is received through the base terminal, thereby allowing the current to flow through the collector terminal.

That is, the constant current driver Q adjusts a current flowing to the collector terminal when a current flowing to the first and second reference resistor and the first and second shunt resistor is less than the reference current. Therefore an amount of current flowing to the first and second reference resistors and the first and second shunt resistors is increased. The constant current driver Q prevents a current from flowing toward the collector terminal when a current flowing to the first and second reference resistor and the first and second shunt resistor is equal to or greater than the reference current. Therefore, an amount of current flowing to the first and second reference resistors and the first and second shunt resistors is reduced.

The current regulator 195 constantly adjusts a value of current outputted through the first and second output pin connected to each of the first and second shunt resistor. The current regulator 195 may adjust the value of current outputted through the output pin to a value of reference current.

The lamp may be connected to the first output pin or the second output pin of the current control apparatus. At this time, a state of the setting pin and a resistance value of the setting resistor may be determined according to information of the output pin connected to the lamp.

The current regulator 195 constantly adjusts the first current outputted through the first output pin a4 when the setting pin a3 is in the open state, and constantly adjusts the second current outputted through the second output pin a5 when the setting pin a3 is in the ground state.

Circuit operation of the current regulator 195 will be described with reference to FIGS. 11 and 12.

Figure 11:
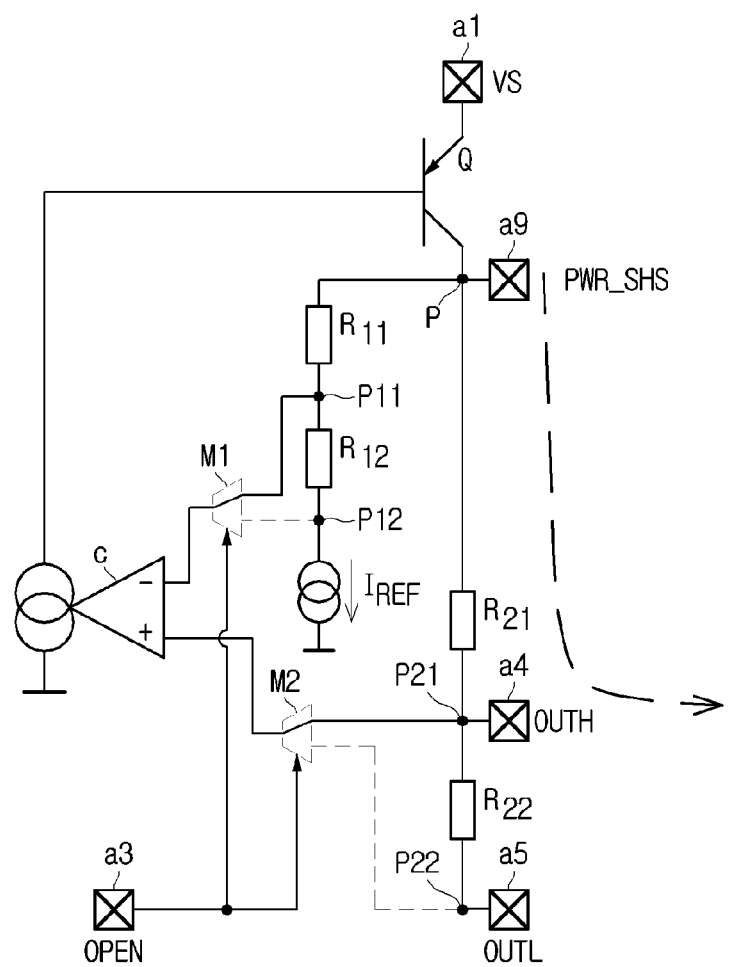
FIG. 11 is a view illustrating a current path of the current control apparatus when a lamp is connected to a first output pin of the current control apparatus shown in FIG. 10.

FIG. 11 is a view illustrating a current path of the current control apparatus when a lamp is connected to a first output pin a4 of a current control apparatus shown in FIG. 10.

The first output pin a4 of the current control apparatus is a pin to output the first current. The lamp connected to the first output pin a4 of the current control apparatus is a lamp operated by the first current.

The current control apparatus adjusts the value of the first current output through the first output pin a4 constantly.

At this time, the setting pin a3 of the current control apparatus may be set to the open state, and thus the first signal selector M1 and the second signal selector M2 may be switched to the first switching state.

The switching the first signal selector M1 to the first switching state includes connecting the first reference sensing point P11 to the inverting input port (−) of the comparator.

The first reference sensing point P11 may be a point to obtain a signal corresponding to a signal obtained by the first output sensing point P21.

The switching the second signal selector M2 to the first switching state includes connecting the first output sensing point P21 to the non-inverting input port (+) of the comparator.

The first output sensing point P21 is a contact point with the first output pin a4 of the current control apparatus. The first output sensing point P21 may be a point to obtain a signal corresponding to a current flowing to the lamp through the first output pin a4 of the current control apparatus.

That is, the first signal selector M1 transmits the first reference signal generated by the first reference sensing point P11 to the inverting input port of the comparator. The second signal selector M2 transmits the first output feedback signal generated by the first output sensing point P21 to the non-inverting input port of the comparator.

The first reference signal generated by the first reference sensing point P11 may be a signal corresponding to a voltage of the first reference resistor. The first output feedback signal generated by the first output sensing point may be a signal corresponding to a voltage of the first shunt resistor.

The comparator amplifies and outputs a value of a difference between the reference signal and the output feedback signal, and the output of the comparator C is transmitted to a constant current driver Q such that the constant current driver Q outputs a constant current.

The comparator C compares the first output feedback signal input to the non-inverting input port with the first reference signal input to the inverting input port, outputs the first signal when the voltage of the first output feedback signal is equal to or greater than voltage of the first reference signal, and outputs the second signal when the voltage of the first output feedback signal is less than the voltage of the first reference signal.

That is, the comparator compares a voltage both ends of the first reference resistor R11 with a voltage both ends of the first shunt resistor R21, outputs the first signal when the voltage both ends of the first shunt resistor R21 is equal to or greater than the voltage both ends of the first reference resistor R11, and outputs the second signal when the voltage both ends of the first shunt resistor R21 is less than the voltage both ends of the first reference resistor R11.

The first signal may be the high signal. The second signal may be the low signal.

The constant current controller 194a controls an operation of the constant current driver based on the signal output by the comparator C.

The constant current controller 194a transmits a first control signal for turning on the constant current driver when the high signal is received, and transmits a second control signal for turning off the constant current driver when the low signal is received.

The first control signal and the second control signal may be different signals.

That is, according to a type of switch element provided in the constant current driver Q, the first control signal may be the high signal and the second control signal may be the low signal.

According to the type of switch element provided in the constant current driver Q, the first control signal may be the low signal and the second control signal may be the high signal.

The constant current driver Q including a PNP transistor will be described as an example.

The constant current driver Q is turned off when the high signal is received through the base terminal, thereby not allowing the current to flow through the collector terminal. The constant current driver Q is turned on when the low signal is received through the base terminal, thereby allowing the current to flow through the collector terminal.

The current control apparatus adjusts the voltage of the first shunt resistor based on the voltage of the first reference resistor thereby allowing a value of the first current output by the first output pin to be adjusted constantly.

That is, the current regulator 195 may allow the first current output by the first output pin a4 to be maintained constantly to the first reference current.

The resistance value of the external setting resistor may be determined based on a value of the first reference current.

As is apparent from the above description, it may be possible to reduce the current error rate by controlling the lamp to the large current based on a current error rate characteristic and a voltage drop characteristic of the lamp. It may be possible to reduce the voltage drop by reducing the internal resistance value (that is, the resistance value of the shunt resistor) of the current control apparatus based on a current error rate characteristic and a voltage drop characteristic of the lamp.

Accordingly, it may be possible to set the value of the first reference current output by the first output pin to be higher based on the current accuracy of the reference value.

The current error rate and the voltage drop characteristics of a general lamp as follow: the smaller a value of current output to the lamp of the light unit, the larger the current error rate. The larger a value of a shunt resistor of the current control apparatus, the smaller the current error rate. The larger a value of a setting resistor of the current control apparatus, the larger the current error rate. The smaller an internal resistance value of the current control apparatus, the more the voltage drop decreases.

The current error rate may be error rate between the current flowing in the lamp and the reference current.

Figure 12:
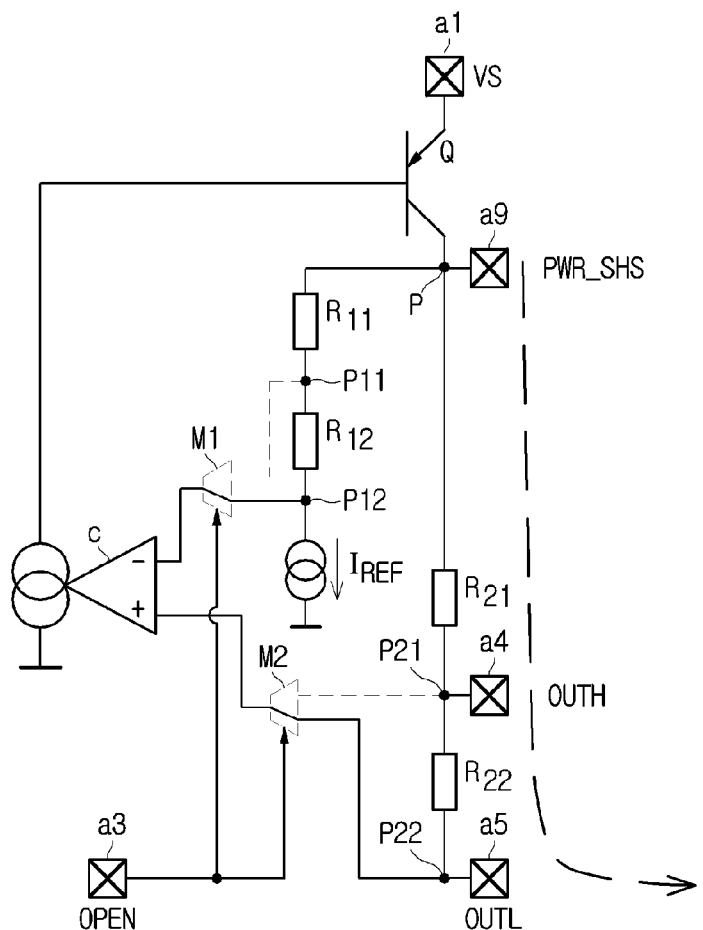
FIG. 12 is a view illustrating a current path of the current control apparatus when a lamp is connected to a second output pin of a current control apparatus shown in FIG. 10.

FIG. 12 is a view illustrating a current path of the current control apparatus when a lamp is connected to a second output pin of a current control apparatus shown in FIG. 10.

The second output pin a5 of the current control apparatus may be a pin that outputs the second current. The lamp connected to the second output pin a5 of the current control apparatus may be the lamp operated by the second current.

The value of the second reference current may be less than the value of the first reference current.

The current control apparatus constantly adjusts the value of the second current output through the second output pin a5.

The setting pin a3 of the current control apparatus may be set to the ground state, and thus the first signal selector M1 and the second signal selector M2 may be switched to the second switching state.

The switching the first signal selector M1 to the second switching state includes connecting the second reference sensing point P12 to the inverting input port (−) of the comparator.

The second reference sensing point P12 may be a point to obtain a signal corresponding to a signal obtained by the second output sensing point P22.

The switching the second signal selector M2 to the second switching state includes connecting the second output sensing point P22 to the non-inverting input port (+) of the comparator.

The second output sensing point P22 is a contact point with the second output pin a5 of the current control apparatus. The second output sensing point P22 may be a point to obtain a signal corresponding to a current flowing to the lamp through the second output pin a5 of the current control apparatus.

That is, the first signal selector M1 transmits the second reference signal generated by the second reference sensing point P12 to the inverting input port of the comparator. The second signal selector M2 transmits the second output feedback signal generated by the second output sensing point P22 to the non-inverting input port of the comparator.

The second reference signal generated by the second reference sensing point P12 may be a signal corresponding to a voltage of both ends of the first reference resistor and the second reference resistor connected in series with each other. The second output feedback signal generated by the second output sensing point P22 may be a signal corresponding to a voltage of both ends of the first shunt resistor and the second shunt resistor connected in series with each other.

The comparator C may be provided using an amplifier. The comparator amplifies and outputs a value of a difference between the reference signal and the output feedback signal, and the output of the comparator C is transmitted to a constant current driver Q such that the constant current driver Q outputs a constant current.

The comparator C compares the second output feedback signal input to the non-inverting input port with the second reference signal input to the inverting input port, outputs the first signal when the voltage of the second output feedback signal is equal to or greater than the voltage of the second reference signal, and outputs the second signal when the voltage of the second output feedback signal is less than the voltage of the second reference signal.

That is, the comparator compares the voltage of both ends of the first and second reference resistor connected in series with each other and the voltage of both ends of the first and second shunt resistor connected in series with each other, outputs the first signal when the voltage of both ends of the first and second shunt resistor connected in series with each other is equal to or greater than the voltage of both ends of the first and second reference resistor connected in series with each other, and outputs the second signal when the voltage of both ends of the first and second shunt resistor connected in series with each other is less than the voltage of both ends of the first and second reference resistor connected in series with each other.

The first signal may be the high signal. The second signal may be the low signal.

The constant current controller 194a controls an operation of the constant current driver based on the signal output by the comparator C.

The constant current controller 194a may transmit a first control signal for turning on the constant current driver when the high signal is received, and may transmit a second control signal for turning off the constant current driver when the low signal is received.

The first control signal and the second control signal may be different signals.

That is, according to a type of switch element provided in the constant current driver Q, the first control signal may be a high signal and the second control signal may be a low signal.

According to the type of switch element provided in the constant current driver Q, the first control signal may be a low signal and the second control signal may be a high signal.

The constant current driver Q including a PNP transistor will be described as an example.

The constant current driver Q is turned off when the high signal is received through the base terminal, thereby not allowing the current to flow through the collector terminal. The constant current driver Q is turned on when the low signal is received by the base terminal, thereby allowing the current to flow through the collector terminal.

The current control apparatus adjusts the voltage of both ends of the first and second shunt resistor based on the voltage of both ends of the first and second reference resistor thereby allowing a value of the second current output by the second output pin to be adjusted constantly.

That is, the current regulator 195 may allow the second current output by the second output pin a5 to be maintained constantly to the first reference current.

The resistance value of the external setting resistor Rref may be determined based on the value of the second reference current.

According to the embodiment of the present disclosure, when controlling the second current, it may be possible to reduce the current error rate by increasing the internal resistance value (that is, the resistance value of the shunt resistor) of the current control apparatus based on a current error rate characteristic and a voltage drop characteristic of the lamp.

Accordingly it may be possible to increase the accuracy of the constant current control.

According to the embodiment of the present disclosure it may be possible to set the value of the second reference current to be lower based on the reference value of the voltage drop.

Figure 13:
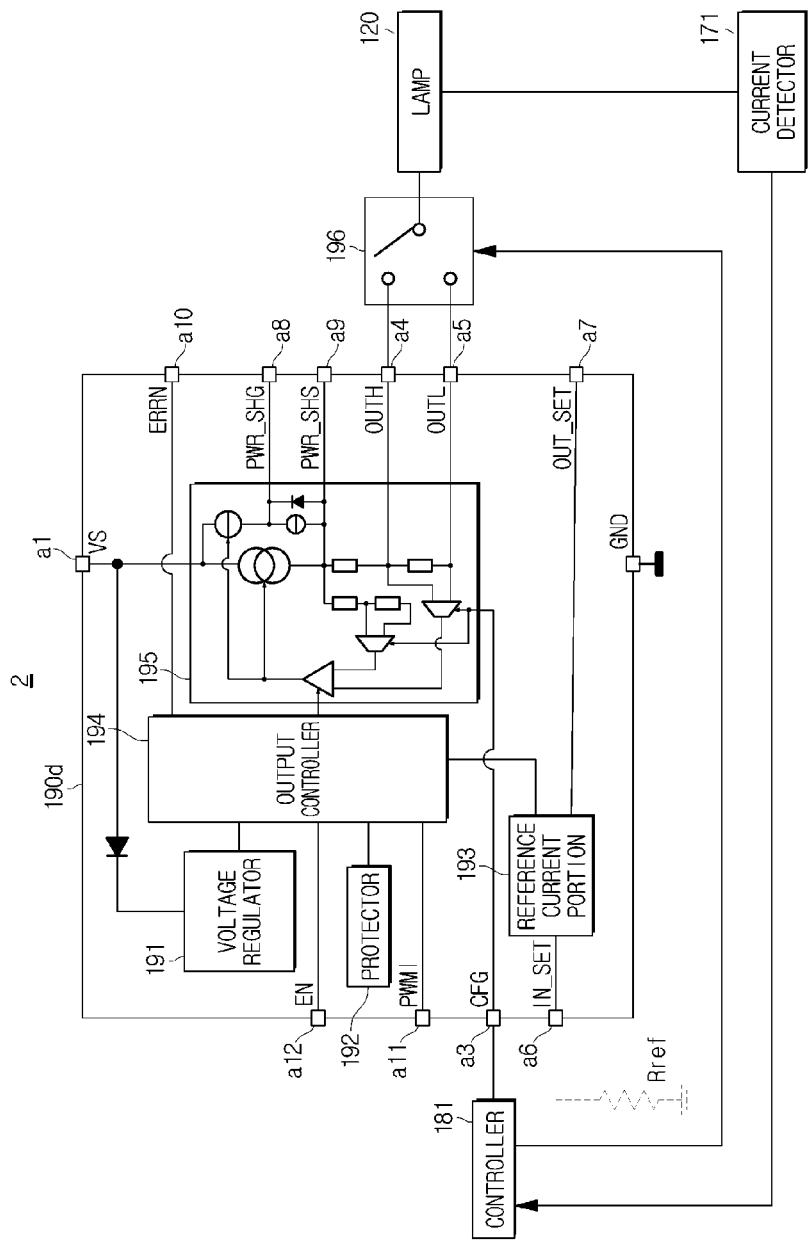
FIG. 13 is a detailed block diagram of a light control apparatus provided in a vehicle in accordance with another embodiment of the present disclosure.

FIG. 13 is a detailed block diagram of a light control apparatus provided in the vehicle in accordance with another embodiment of the present disclosure.

A light control apparatus 2 in accordance with another embodiment of the present disclosure includes a light unit 120, a current detector 171, a controller 181, a driver 190 and an output selector 196.

The light control apparatus 2 in accordance with another embodiment of the present disclosure further includes a power supplier 150, an input 160 and a detector 170. The power supplier 150, the input 160 and the detector 170 are the same as those described above according to the previous embodiment, and thus descriptions thereof will be omitted.

According to another embodiment of the present disclosure, the light control apparatus 2 further includes a configuration configured to automatically set a state of a setting pin a3 and configured to set an output pin to which the lamp is connected, when it is not known whether a lamp of the light unit 120 connected to the current control apparatus 190d of the driver is controlled by the first current or the second current. A same construction with those described above according to the previous embodiment among constructions of a current control apparatus 190d of the driver and controller 181 will be omitted.

The light unit 120 includes the plurality of lamps.

The lamp may be a lamp provided on the exterior of the vehicle or a lamp provided on the interior of the vehicle.

The current detector 171 detects a current flowing through the lamp and transmits information of the detected current to the controller 181.

When the setting command is input through an input separately provided, the controller 181 sets a setting pin a3 to the open state, and controls the output selector 196 so that the lamp of the light unit is electrically and mechanically connected to the first output pin a4.

The controller 181 maintains or changes the setting pin a3 and a state of the first output pin based on a current detected by the current detector 171.

The controller 181 allows a switching state of a signal selection part to be changed by changing the state of the setting pin.

When setting a state of the setting pin and the output pin is completed, the controller 181 maintains the state of the output pin and the setting pin until the lamp is replaced.

The driver 190 may include an integrated circuit (IC). The driver 190 may be a current control apparatus 190d configured to constantly control a current of the lamp.

The current control apparatus 190d constantly adjusts the first current outputted through the first output pin when the setting pin is in the open state, and constantly adjusts the second current outputted through the second output pin when the setting pin is in the ground state.

The output selector 196 includes two switch connected to each of the first output pin and the second output pin, and allows the lamp to be electrically connected to the first output pin or the second output pin based on a control command of the controller 181.

Figure 14:
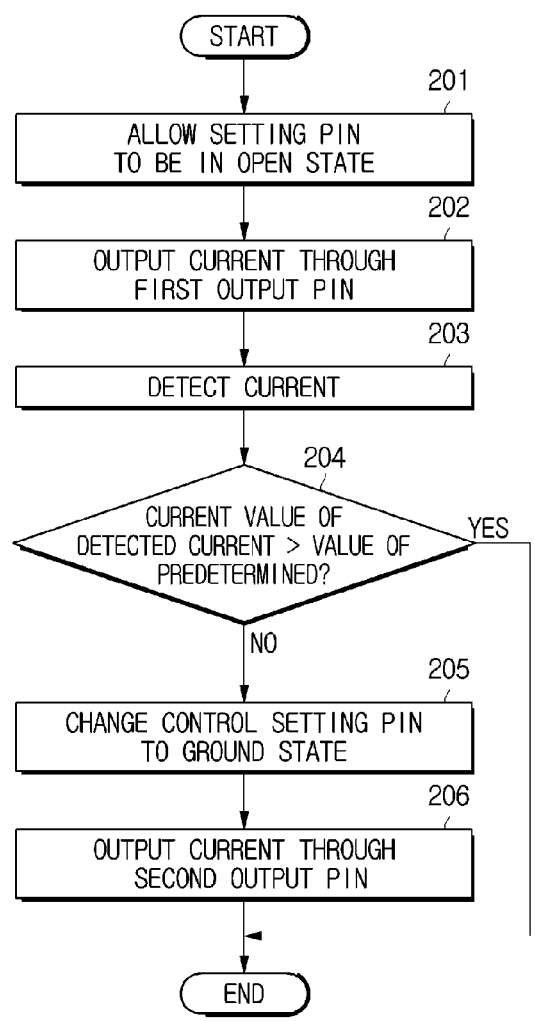
FIG. 14 is a flowchart illustrating a method for controlling the light control apparatus in accordance with another embodiment of the present disclosure.

FIG. 14 is a flowchart illustrating a method for controlling the light control apparatus in accordance with another embodiment of the present disclosure.

When a setting command is received, the light control apparatus allows a setting pin a3 of a current control apparatus 190d to be in the open state (201), and controls a output selector 196 so that the lamp of the light unit 120 is connected to a first output pin a4 thereby allowing the first current to be output to lamp through the first output pin (202).

At this time, the first current flows constantly from the constant current driver of the current regulator and the first output pin to the lamp.

The light control apparatus detects a current flowing to the lamp by the current detector 171, obtains a value of the detected current based on information the detected current, and compares the value of the detected current with a value of a predetermined set current (204).

When the value of the detected current is greater than the value of the predetermined set current, the light control apparatus maintains the setting pin a3 in the open state and maintains a connection between the first output pin and the lamp.

When the value of the detected current is equal to or less than the value of the predetermined set current, the light control apparatus changes the setting pin a3 to the ground state (205), and controls an output selector 196 so that the lamp is connected to the second output pin thereby allowing a second current to be output to the lamp through the second output pin (206).

At this time, the second current flows constantly to the lamp through the constant current driver of the current regulator and the second output pin.

When setting a state is completed, the light control apparatus maintains the state of the setting pin and the output pin, and supplies a current constantly to the lamp.

That is, supplying the current when the lamp is connected to the first output pin of the current control apparatus current, and supplying the current when the lamp is connected to the second output pin of the current control apparatus, are the same as those of the light control apparatus according to the previous embodiment, and thus descriptions thereof will be omitted.

Figure 15:
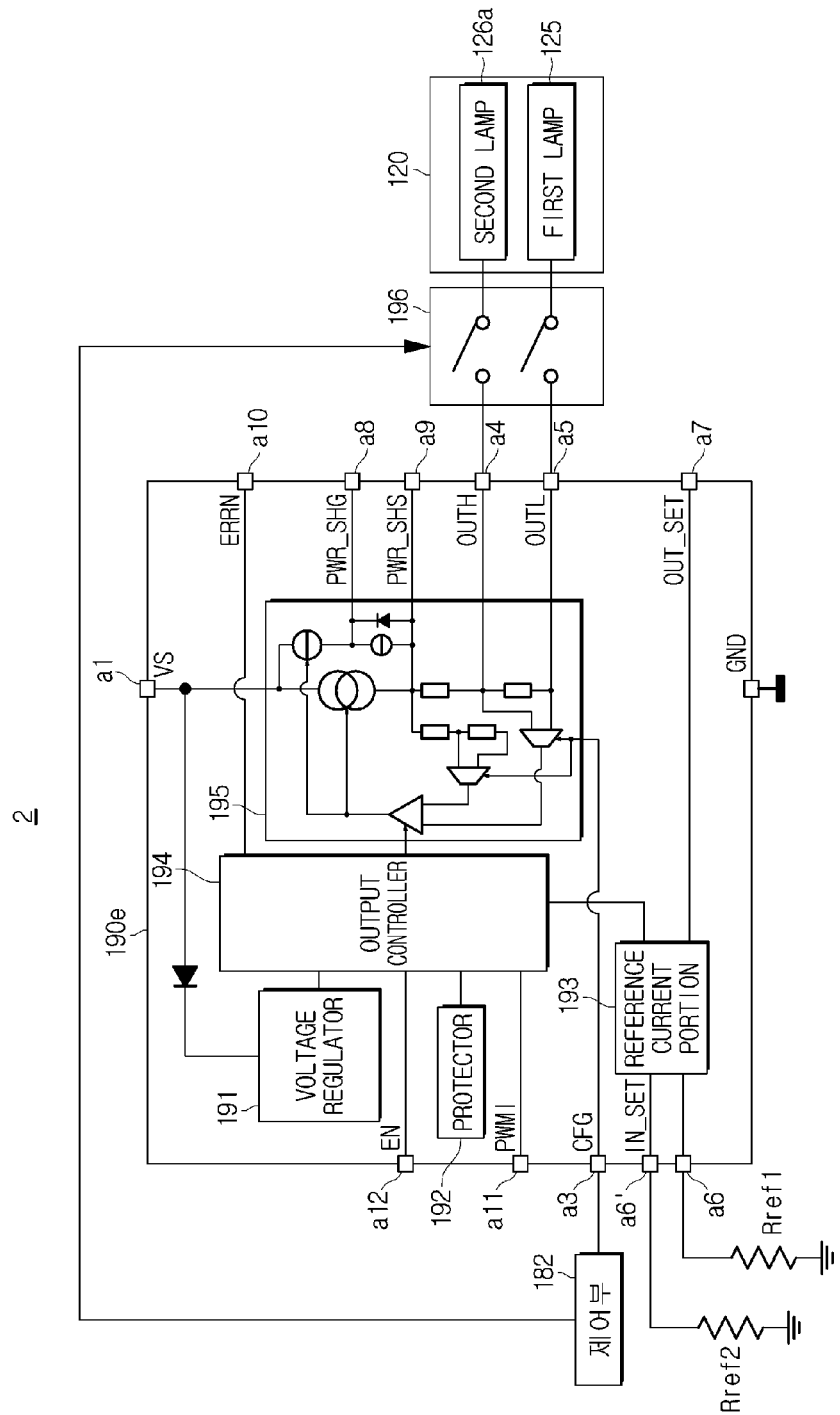
FIG. 15 is a detailed block diagram of a light control apparatus provided in a vehicle in accordance with another embodiment of the present disclosure.

FIG. 15 is a detailed block diagram of a light control apparatus provided in the vehicle in accordance with another embodiment of the present disclosure.

A light control apparatus 2 in accordance with another embodiment of the present disclosure includes a light unit 120, a controller 182, a driver 190 and an output selector 197.

The light control apparatus 2 in accordance with another embodiment of the present disclosure further includes a power supplier 150, an input 160 and a detector 170. The power supplier 150, the input 160 and the detector 170 are the same as those described above according to the previous embodiment, and thus descriptions thereof will be omitted.

The light control apparatus 2 in accordance with another embodiment of the present disclosure further includes a configuration for controlling a current supplied to a lamp of the light unit 120 connected to each of a first and second output pin of a current control apparatus 190e of the driver.

The light unit 120 includes the plurality of lamps.

Two lamps may be connected to one current control apparatus. The two lamps operate independently of each other and do not operate at the same time.

When a first lamp ON command is received, the controller 182 allows the first lamp to be connected to the second output pin by turning on the switch of the output selector 197, allows the setting pin to be in the ground state, and transmits the first lamp-ON command to the current control apparatus 190e.

When the first lamp ON command is received, the controller 182 may separate the first lamp from the second output pin by turning off the output selector 197.

When a second lamp ON command is received, the controller 182 allows the second lamp to be connected to the first output pin by turning on the switch of the output selector 197, allows the setting pin to be in the open state, and transmits the second lamp ON command to the current control apparatus 190e.

Brightness of the second lamp is brighter than brightness of the first lamp.

A value of current for driving the second lamp is higher than a value of current for driving the first lamp.

When the second lamp ON command is received, the controller 182 may separate the second lamp from the first output pin by turning off the switch of the output selector 197.

The controller 182 may separate a connection with the first setting resistor Rref1 when the second lamp ON command is received, and may separate a connection with the second setting resistor Rref2 when the first lamp ON command is received.

The driver 190 may include an integrated circuit (IC). The integrated circuit may include a current control apparatus configured to constantly control a current of the lamp.

Unlike the current control apparatus of one embodiment, the current control apparatus of another embodiment may include a first setting resistor Rref1 to set the first reference current and a second setting resistor Rref2 to set the second reference current.

The current control apparatus may further include a pin to connect a second setting resistor. Alternatively, the current control apparatus may connect a second setting resistor using an unconnected pin.

The current control apparatus 190e allows the first current to be output through the first output pin constantly when the second lamp ON command is received, and allows the second current to be output through the second output pin constantly when the first lamp ON command is received.

The controlling the current of the current control apparatus constantly (that is, maintaining the current output constantly as the reference current) is the same as those described above according to the previous embodiment, and thus descriptions thereof will be omitted.

The output selector 197 includes a switch connectable to the first output pin and a switch connectable to the second output pin.

The output selector 197 allows one of the first output pin and the second output pin with the second lamp to be electrically connected based on the control command of the controller 182.

The controller may be any one of an electronic control unit (ECU), a microprocessor, a CPU, and a processor configured to control the traveling of the vehicle, to control a communication with the external device, and to control the operation of the external lamps. The controller may be implemented using a memory (not shown) configured to store data for algorithms to control operation of elements of the vehicle 1 or programs constructed from algorithms, and a processor (not shown) configured to execute the operation by using data stored in the memory. In this case, the memory and the processor may be implemented using separate chips or integrated into a single chip.

Each of the above-described embodiments exemplifies a current control apparatus to control the current of the lamp of the vehicle. In addition to the lamp of the vehicle, the present disclosure can be implemented at the current control apparatus using currents of various loads.

As is apparent from the above description, it may be possible to reduce the voltage drop by reducing the internal resistance value of the current control apparatus when controlling the lamp with the large current, and to reduce the current error rate by increasing the internal resistance value of the current control apparatus when controlling the lamp with the small current. Therefore, it may be possible to increase the accuracy of the constant current control.

It may be possible to reduce an amount of the generated internal heat by reducing the internal voltage drop, and to increase the value of the output current by reducing the amount of the generated internal heat.

It may be possible to broaden the range of value of the output current according to the increase of the value of the output current, nevertheless it may be possible to reduce the current error rate and supply the stable current.

It may be possible to freely perform the design by broadening the value of the output current and increasing the accuracy the constant current control.

It may be possible to reduce the number of parts and elements of the current control apparatus for controlling the lamp, simplify the circuit, and reduce the cost.

It may be possible to be applicable to a platform of a current control apparatus for controlling the plurality of lamps provided in the vehicle.

As described above, it may be possible to improve the quality and merchantability of a vehicle equipped with a current control apparatus for a lamp, and it may be possible to further improve the convenience of the user and the safety of the vehicle, and ensure the competitiveness of the product.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A current control apparatus for a vehicle, comprising:
a plurality of output pins configured to output currents of different values;
an output signal feedback part connected to each of the plurality of output pins, and configured to generate one of a plurality of output feedback signals corresponding to each of the plurality of output pins;
a reference signal generation part configured to generate one of a plurality of reference signals corresponding to each of a plurality of target outputs;
a signal selection part configured to select one of the plurality of output feedback signals, and to select one of the plurality of reference signals;
a comparator configured to receive the one of the plurality of output feedback signals, to receive the one of the plurality of reference signals, to compare the received output feedback signal to the received reference signal, and to output a signal difference between the received output feedback signal and the received reference signal; and
a constant current driver configured to adjust a constant current output through one of the plurality of output pins based on the signal difference between the received output feedback signal and the received reference signal.

2. The current control apparatus according to claim 1, wherein the reference signal generation part includes a first reference resistor, a second reference resistor connected to the first reference resistor in series, and a reference current portion connected in series or connected via a current mirror circuit to the second reference resistor,
wherein the plurality of reference signals includes a first reference signal output through one end of the first reference resistor, and a second reference signal output through one end of the second reference resistor, wherein the end of the second reference resistor outputting the second reference signal is not adjacent to the first reference resistor,
wherein the output signal feedback part includes a first shunt resistor, and a second shunt resistor connected in series to the first shunt resistor, and
wherein the plurality of output feedback signal includes a first output feedback signal output through one end of the first shunt resistor, and a second output feedback signal output through one end of the second shunt resistor, wherein the end of the second shunt resistor outputting the second output feedback signal is not adjacent to the first shunt resistor.

3. The current control apparatus according to claim 2, wherein the signal selection part includes a first signal selector to connect a first input port of the comparator with one of the first reference signal and the second reference signal, and a second signal selector to connect a second input port of the comparator with one of the first output feedback signal and the second output feedback signal.

4. The current control apparatus according to claim 3, wherein the plurality of output pins includes a first output pin to output the first current, and a second output pin to output a second current having a more accurate value in lower current range than a value of the first current,
 wherein the first signal selector transmits the first reference signal to the first input port of the comparator when a load is connected to the first output pin, and transmits the second reference signal to the first input port of the comparator when the load is connected to the second output pin, and
 wherein the second signal selector transmits the first output feedback to the second input port of the comparator when the load is connected to the first output pin, and transmits the second output feedback signal to the second input port of the comparator when the load is connected to the second output pin.

5. The current control apparatus according to claim 4, wherein the comparator compares a voltage of the first reference signal input to the first input port with a voltage of the first output feedback signal input to the second input port when the load is connected to the first output pin, amplifies and outputs a value of a difference between the voltage of the first reference signal and the voltage of the first output feedback signal, and compares a voltage of the second reference signal input to the first input port with a voltage of the second output feedback signal input to the second input port when the load is connected to the second output pin, amplifies and outputs a value of a difference between the voltage of the second reference signal and the voltage of the second output feedback signal.

6. The current control apparatus according to claim 4, further comprising a reference current portion configured to set at least one of the voltage of the first reference signal input corresponding to the first current, and a voltage of the second reference signal input corresponding to the second current.

7. The current control apparatus according to claim 3, further comprising a setting pin connected to each of the first signal selector and the second signal selector, and configured to change a switching state of the first signal selector and the second signal selector.

8. The current control apparatus according to claim 7,
 wherein the setting portion is connected to the setting pin for configuring the setting pin voltage and deciding a switching state of the first signal selector and the second signal selector depending on the setting pin voltage.

9. A vehicle, comprising:
a lamp; and
a current control apparatus connected to the lamp, and configured to constantly control a current flowing through the lamp,
wherein the current control apparatus includes:
a plurality of output pins configured to output currents of different values;
an output signal feedback part connected to each of the plurality of output pins, and configured to generate at least one of a plurality of output feedback signals corresponding to each of the plurality of output pins;
a reference signal generation part configured to generate at least one of a plurality of reference signals corresponding to each of the plurality of target outputs;

a signal selection part configured to select one of the plurality of output feedback signals, and to select one of the plurality of reference signals;
a comparator configured to receive the one of the plurality of output feedback signals, to receive the one of the plurality of reference signals, to compare the received output feedback signal to the received reference signal, and to output a signal difference between the received output feedback signal and the received reference signal; and
a constant current driver configured to adjust a constant current output through an output pin connected to the lamp, among the plurality of output pins based on the signal difference between the received output feedback signal and the received reference signal.

10. The vehicle according to claim 9,
 wherein the reference signal generation part includes a first reference resistor, a second reference resistor connected to the first reference resistor in series, and a reference current portion connected in series or connected via current mirror circuit to the second reference resistor,
 wherein the plurality of reference signals includes a first reference signal output through one end of the first reference resistor, and a second reference signal output through one end of the second reference resistor, wherein the end of the second reference resistor outputting the second reference signal is not adjacent to the first reference resistor,
 wherein the output signal feedback part includes a first shunt resistor, and a second shunt resistor connected in series to the first shunt resistor, and
 wherein the plurality of output feedback signal includes a first output feedback signal output through one end of the first shunt resistor, and a second output feedback signal output through one end of the second shunt resistor, wherein the end of the second shunt resistor outputting the second output feedback signal is not adjacent to the first shunt resistor.

11. The vehicle according to claim 10, wherein the signal selection part includes a first signal selector to transmit one of the first reference signal and the second reference signal to a first input port of the comparator, and a second signal selector to transmit one of the first output feedback signal and the second output feedback signal to a second input port of the comparator.

12. The vehicle according to claim 11, wherein the plurality of output pins includes a first output pin to output a first current, and a second output pin to output a second current having a more accurate value in lower current range than a value of the first current,
 wherein the first signal selector transmits the first reference signal to the first input port of the comparator when a load is connected to the first output pin, and transmits the second reference signal to the first input port of the comparator when the load is connected to the second output pin, and
 wherein the second signal selector transmits the first output feedback signal to the second input port of the comparator when the load is connected to the first output pin, and transmits the second output feedback signal to the second input port of the comparator when the load is connected to the second output pin.

13. The vehicle according to claim 12, wherein the comparator compares a voltage of the first reference signal input to the first input port with a voltage of the first output feedback signal input to the second input port when the load is connected to the first output pin, amplifies and outputs a value of a difference between the voltage of the first reference signal and the voltage of the first output feedback signal, and compares a voltage of the second reference signal input to the first input port with a voltage of the second output feedback signal input to the second input port when the load is connected to the second output pin, amplifies and outputs a value of a difference between the voltage of the second reference signal and the voltage of the second output feedback signal.

14. The vehicle according to claim 12, further comprising:
a reference current portion configured to set a reference current; and
a current regulator configured to generate a mirrored reference current,
wherein the reference signal generation part configured to generate a first reference signal and a second reference signal, and
wherein the setting portion is connected to the setting pin for configuring the setting pin voltage and deciding a switching state of the first signal selector and the second signal selector depending on the setting pin voltage.

15. The vehicle according to claim 11, further comprising a setting pin connected to each of the first signal selector and the second signal selector, and configured to change a switching state of the first signal selector and the second signal selector,
wherein the first signal selector and the second signal selector are changed to a first switching state when the setting pin is in an open state, and the first signal selector and the second signal selector are changed to a second switching state when the setting pin is in a ground state.

16. The vehicle according to claim 15, further comprising:
an output selector selectively connected to one of the first output pin and the second output pin;
a current detector configured to detect a current of the lamp; and
a controller configured to allow the setting pin to be in the open state, to control the output selector so that the lamp is connected to the first output pin when a setting command is received, to maintain a state of the setting pin and a state of output selector when the detected current is greater than or equal to a predetermined set current, to change the state of the setting pin to a ground state, and to control the output selector so that the lamp is connected to the second output pin when the detected current is less than the predetermined set current.

17. The vehicle according to claim 16, wherein the controller receives the comparison signal of the comparator, and controls a turn on operation or a turn off operation of the constant current driver based on the received comparison signal.

18. A vehicle, comprising:
a light unit having a plurality of lamps;
a driver having a plurality of current control apparatuses connected to each of the plurality of lamps; and
a controller configured to transmit an operation command of at least one of the plurality of lamps to the driver,
wherein each of current control apparatuses of the driver includes:
a plurality of output pins configured to output currents of different values;
an output signal feedback part configured to generate an output feedback signal corresponding to one of the plurality of output pins when the operation command is received, wherein the one of the plurality of output pins is connected to the lamp; and
a constant current driver configured to adjust a constant current of the lamp based on the output feedback signal.

* * * * *